(12) United States Patent
Rao

(10) Patent No.: US 9,906,401 B1
(45) Date of Patent: Feb. 27, 2018

(54) NETWORK VISIBILITY APPLIANCES FOR CLOUD COMPUTING ARCHITECTURES

(71) Applicant: Gigamon Inc., Santa Clara, CA (US)

(72) Inventor: Anil Rao, Santa Clara, CA (US)

(73) Assignee: Gigamon Inc., Santa Clara, CA (US)

( * ) Notice: Subject to any disclaimer, the term of this patent is extended or adjusted under 35 U.S.C. 154(b) by 0 days.

(21) Appl. No.: 15/433,864

(22) Filed: Feb. 15, 2017

Related U.S. Application Data

(60) Provisional application No. 62/425,577, filed on Nov. 22, 2016.

(51) Int. Cl.
*G06F 15/173* (2006.01)
*H04L 12/24* (2006.01)
*H04L 29/08* (2006.01)
*H04L 12/46* (2006.01)

(52) U.S. Cl.
CPC ........ *H04L 41/046* (2013.01); *H04L 12/4633* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 7,680,100 B1 * | 3/2010 | Corliss | ................ | H04L 12/4633 370/354 |
| 2006/0126645 A1 * | 6/2006 | Devarapalli | ........ | H04L 63/0272 370/401 |
| 2008/0137591 A1 * | 6/2008 | Hirano | ..................... | H04L 63/18 370/328 |
| 2011/0318011 A1 * | 12/2011 | Brassil | ..................... | H04J 14/02 398/82 |
| 2015/0040228 A1 * | 2/2015 | Lee | ..................... | H04L 63/1433 726/25 |
| 2015/0074258 A1 * | 3/2015 | Ferreira | .............. | H04L 43/0876 709/224 |
| 2015/0128245 A1 * | 5/2015 | Brown | .................. | H04L 47/323 726/12 |
| 2015/0229656 A1 * | 8/2015 | Shieh | .................. | H04L 63/1408 726/22 |
| 2015/0244716 A1 * | 8/2015 | Potlapally | ............. | H04L 63/064 713/155 |
| 2015/0295758 A1 * | 10/2015 | Melander | ............ | H04W 76/022 370/254 |
| 2016/0357587 A1 * | 12/2016 | Yadav | ................. | H04L 63/1425 |
| 2017/0034010 A1 * | 2/2017 | Fong | ...................... | H04L 41/20 |
| 2017/0099195 A1 * | 4/2017 | Raney | ................. | H04L 12/4633 |

* cited by examiner

*Primary Examiner* — Brian Whipple
(74) *Attorney, Agent, or Firm* — Perkins Coie LLP

(57) ABSTRACT

With exponential growth in virtualized traffic within physical data centers, many end users (e.g., individuals and enterprises) have begun moving work processes and data to cloud computing platforms. However, accessing virtualized traffic traversing the cloud computing platforms for application, network, and security analysis is a challenge. Introduced here, therefore, are visibility platforms for monitoring virtualized traffic traversing a cloud computing platform, such as Amazon Web Services, VMware, and OpenStack. A visibility platform can be integrated into a cloud computing platform to provide a coherent view of virtualized traffic in motion across the cloud computing platform for a given end user. Said another way, a visibility platform can intelligently select, filter, and forward virtualized traffic belonging to an end user to a monitoring infrastructure, thereby eliminating traffic blind sports.

23 Claims, 16 Drawing Sheets

1500

Integrate with cloud computing platform APIs to identify inventory, network configuration, etc.
1501

Selectively access virtualized traffic traversing the cloud computing platform
1502

Aggregate virtualized traffic and apply traffic intelligence measure(s)
1503

Optimize the aggregated virtualized traffic
1504

Mask the virtualized traffic before the backhaul
1505

Establish a tunnel between the remote visibility platform and the local visibility platform
1506

Route virtualized traffic to the local visibility platform via the tunnel
1507

FIG. 15

NETWORK VISIBILITY APPLIANCES FOR CLOUD COMPUTING ARCHITECTURES

CROSS-REFERENCE TO RELATED APPLICATIONS

This application claims priority to U.S. Provisional Patent Application No. 62/425,577 titled "Programmable Network Switches for Cloud Computing Architectures" and filed on Nov. 22, 2016, which is incorporated by reference herein in its entirety.

FIELD OF THE INVENTION

At least one embodiment of the present disclosure pertains to traffic monitoring infrastructures, and more particularly, to techniques for forwarding virtual machine traffic flows to monitoring infrastructures.

BACKGROUND

Cloud computing is a type of network-based computing that provides shared processing resources and data to computing devices on demand. More specifically, cloud computing models enable on-demand access to a shared pool of configurable processing resources (e.g., computer networks, servers, storage mediums, applications, and/or services) that can be rapidly provisioned and released with minimal management effort.

Several different models exist for deploying cloud computing infrastructures. "Private clouds," for example, are infrastructures that operate solely for a single end user (e.g., an enterprise or individual). Private clouds can be managed internally (e.g., by the end user) or by a third party, and they can be hosted internally or externally. "Public clouds," meanwhile, are infrastructures that are open for public use (i.e., are accessible to multiple end users). Although there may be little or no technical difference between private and public cloud infrastructures, security considerations may vary substantially based on the number of end users to whom a cloud computing platform is made available.

Infrastructure-as-a-Service is a form of cloud computing that provides virtualized computing resources over a network, such as the Internet. The rapid evolution of IaaS has brought advantages such as economies of scale, elasticity, and agility to enterprises seeking to modernize their information technology (IT) and data center infrastructures. Consequently, many enterprise administrators have begun re-evaluating past decisions to deploy or scale applications on premises, and instead have begun considering deploying or scaling applications across a cloud computing platform.

BRIEF DESCRIPTION OF THE DRAWINGS

One or more embodiments of the present invention are illustrated by way of example and not limitation in the figures of the accompanying drawings, in which like references indicate similar elements.

FIG. 15 depicts a process for extending an end user's on-premise visibility platform to a cloud computing infrastructure, as shown in FIG. 11

DETAILED DESCRIPTION

Figure 1:
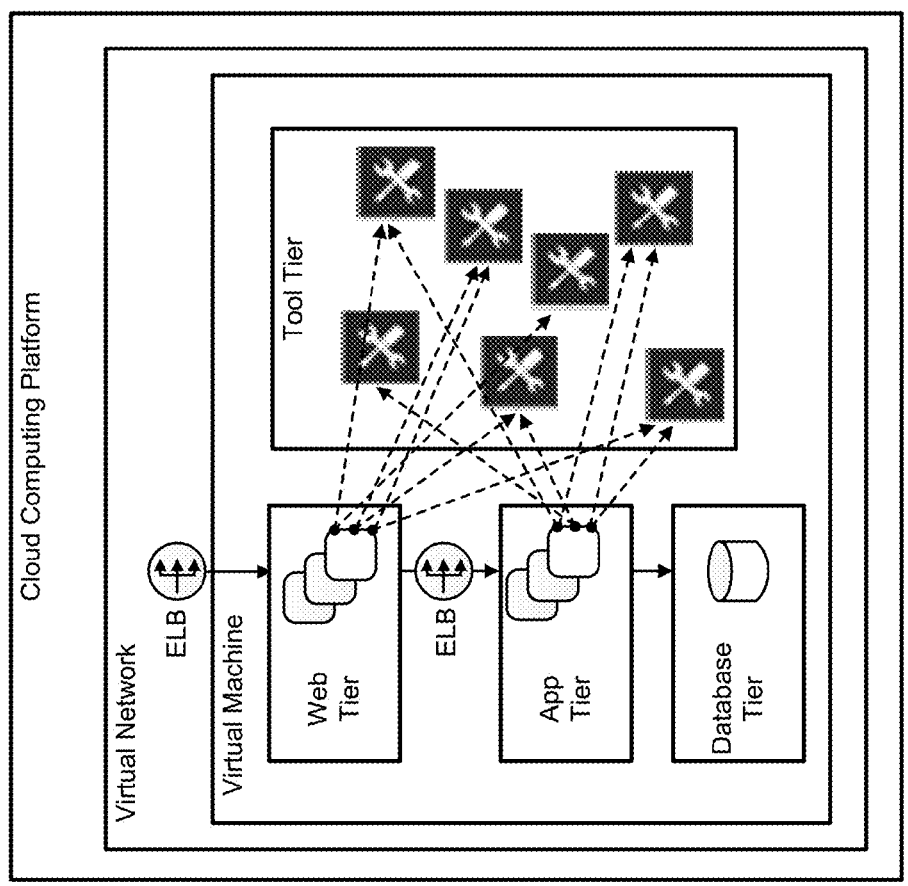
FIG. 1 depicts a conventional cloud computing platform having a three-tier architecture that includes a Web Tier, an Application (App) Tier, and a Database Tier.

In this description, references to "an embodiment," "one embodiment," and the like, mean that the particular feature, function, structure, or characteristic being described is included in at least one embodiment introduced here. Occurrences of such phrases in this specification do not necessarily all refer to the same embodiment, nor are the embodiments referred to herein necessarily mutually exclusive.

With exponential growth in virtualized traffic within physical data centers, many end users (e.g., individuals and enterprises) have begun moving work processes and data to cloud computing platforms. However, accessing virtualized traffic traversing the cloud computing platforms for application, network, and security analysis is a challenge.

Introduced here, therefore, are network visibility appliances (also referred to as "visibility platforms") for monitoring virtualized traffic traversing a cloud computing platform, such as Amazon Web Services, VMware, or OpenStack. A visibility platform can be integrated into a cloud computing platform to provide a coherent view of virtualized traffic in motion across the cloud computing platform for a given end user. Said another way, a visibility platform can intelligently select, manipulate, and forward virtualized traffic belonging to an end user to a monitoring infrastructure, thereby eliminating traffic blind sports.

A visibility platform can include one or more agents for mirroring virtualized traffic traversing a cloud computing platform, a programmable switch (also referred to as a "switching engine") for aggregating and filtering the virtualized traffic, one or more controllers, and a client for managing the visibility platform as a whole.

Each agent is fully contained within a target virtual machine whose virtualized traffic is to be monitored. Such an implementation allows virtual machine traffic flows of interest to be selected, forwarded, and delivered to a monitoring infrastructure (e.g., a programmable switch that is connected to one or more network tools). Although the agent(s) serve requests issued by the controller(s), each agent is responsible for dispatching its own virtualized traffic back to the monitoring infrastructure.

The programmable switch, which may be a physical or virtual switch, is responsible for aggregating virtualized traffic mirrored by the agent(s), and then forwarding at least some of the aggregated virtualized traffic to one or more network tools for further analysis. In some embodiments, the programmable switch filters and/or manipulates (e.g., by slicing, masking, sampling, and/or replicating) the aggregated virtualized traffic before forwarding it downstream to the network tool(s).

The controller(s), meanwhile, may be controllable by the end user via the client, which may be hosted on the cloud computing platform on in an on-premises environment controlled by the end user. Together, the client and the controller(s) enable centralized management of the visibility platform as a whole. For example, the client may be configured to integrate with one or more application programming interfaces (APIs) offered by the cloud computing platform in order to retrieve relevant information about the virtualized traffic being monitored.

Such a design not only provides greater visibility into virtualized traffic traversing a cloud computing platform, but can also extend the reach and leverage of existing network tools already owned or managed by the end user to begin monitoring virtual network infrastructure.

General System Overview

FIG. 1 depicts a conventional cloud computing platform having a three-tier architecture that includes a Web Tier, an Application (App) Tier, and a Database Tier. Many enterprise administrators have begun deploying or scaling applications across cloud computing platforms (also referred to as "cloud management frameworks"), such as Amazon Web Services, VMware, and OpenStack. For example, many enterprise administrators have begun deploying applications on cloud computing platforms and/or using cloud computing platforms for high-bandwidth or "bursty" needs to augment on-premise storage environments (e.g., private clouds and physical data centers). In both cases, a hybrid cloud is ultimately created for the enterprise. Other enterprises may start with cloud computing resources and no physical data center footprint. Such a model is commonly referred to as a "born-in-the-cloud" model.

Unlike Software-as-a-Service (SaaS) environments in which application ownership and information security is the responsibility of the SaaS provider, an Information-as-a-Service (IaaS) environment (e.g., a public cloud) assigns these responsibilities to the end user. Accordingly, migrating existing workloads onto a cloud computing platform introduces new responsibilities and challenges for the individuals responsible for managing the move. For example, migration may require an end user manage, secure, and understand data that is now traversing a public cloud infrastructure (which is not controlled by the end user). Traditional security tools that were developed for physical data centers and private clouds are simply not able to acquire this data of interest. Consequently, end users that migrate or deploy workloads to a public cloud face several challenges, including:

An inability to access virtualized traffic that is traversing the cloud computing platform for analysis (and, by extension, information about the virtualized traffic);

An inability to access data and perform tasks (e.g., deep packet inspection) in support of forensics, end user experience management, threat detection, and network tools;

A lack of visibility into vertical traffic flows (also referred to as North-South traffic) that may be necessary for compliancy and vertical threat detection/mitigation, such as Elastic Load Balancer (ELB) to Web Tier traffic;

A lack of visibility into horizontal traffic flows (also referred to as East-West traffic) that may be necessary for compliancy and lateral threat detection/mitigation, such as Web Tier to App Tier traffic or App Tier to Database Tier traffic;

A lack of sufficient, appropriate network tools (e.g., within a Tool Tier);

An inability to troubleshoot and debug virtual networks; and

Increased and varied costs should an end user choose to backhaul virtualized traffic from the cloud computing platform to an end user-controlled environment where one or more network tools are located.

When an end user uses an on-premise, single-tenant cloud computing platform (i.e., a private cloud), several options exist for accessing virtualized traffic traversing the private cloud infrastructure for real-time analysis. For example, virtualized traffic can be diverted using physical or virtual agents (e.g., tapping agents), switched port analyzer (SPAN) sessions, or other network visibility solutions. Agents are generally favored for gaining reliable, non-intrusive access to critical virtualized traffic traversing a network.

However, these options are typically not available when applications or workloads are deployed on a multi-tenant cloud computing platform (i.e., a public cloud). Reliably monitoring virtualized traffic traversing such infrastructures instead involves placing one or more tap devices at appropriate locations within the public cloud infrastructure. In some embodiments, traffic analyzers are attached to some or all of the tap device(s). The traffic analyzers can then see the same data packets passing through those network segments (i.e., as if the traffic analyzers were also inline with the traffic). A logical tap device can be constructed and implemented in several different ways.

First, the port mirroring functionality of a network switching element (e.g., a virtual or physical programmable switch) may be used to send a copy of data packets traversing one port to another port on the same network switching element. Although this functionality is supported by many modern physical and virtual programmable switches, it cannot be used to monitor the activity in many virtual networks due to two architectural characteristics of cloud computing platforms, multi-tenancy and location independence.

Multi-tenancy allows available resources and services to be shared among different end users (e.g., tenants of virtual machines). Each end user is provided with an environment that is completely isolated from other end users to the extent that a single end user may be oblivious that other end users may be co-existing. Multi-tenancy promotes delegation of control in a safe and secure manner. For example, end users may be permitted to create and administer their own private virtual networks. Location independence, meanwhile, is primarily concerned with hiding the identifies of individual infrastructure components from the virtualized workloads, which makes it possible to relocate running virtual machines from one physical host to another. Another important benefit of location independence is improved efficiency in resource allocation that causes end users to be unaware of the physical hosts on which their virtual machine(s) are running. In fact, virtual machines belonging to different tenants may be placed on the same physical host. In a shared ecosystem, end users are not given direct access to the underlying switching fabric that may include host-level virtual switches, top-of-rack switches, etc. This restriction avoids the possibility of any cross-tenant data leakage between the virtual machines. Unfortunately, this also means that the port-mirroring capability of the virtual switches supporting those virtual machines can no longer be used.

Figure 2:
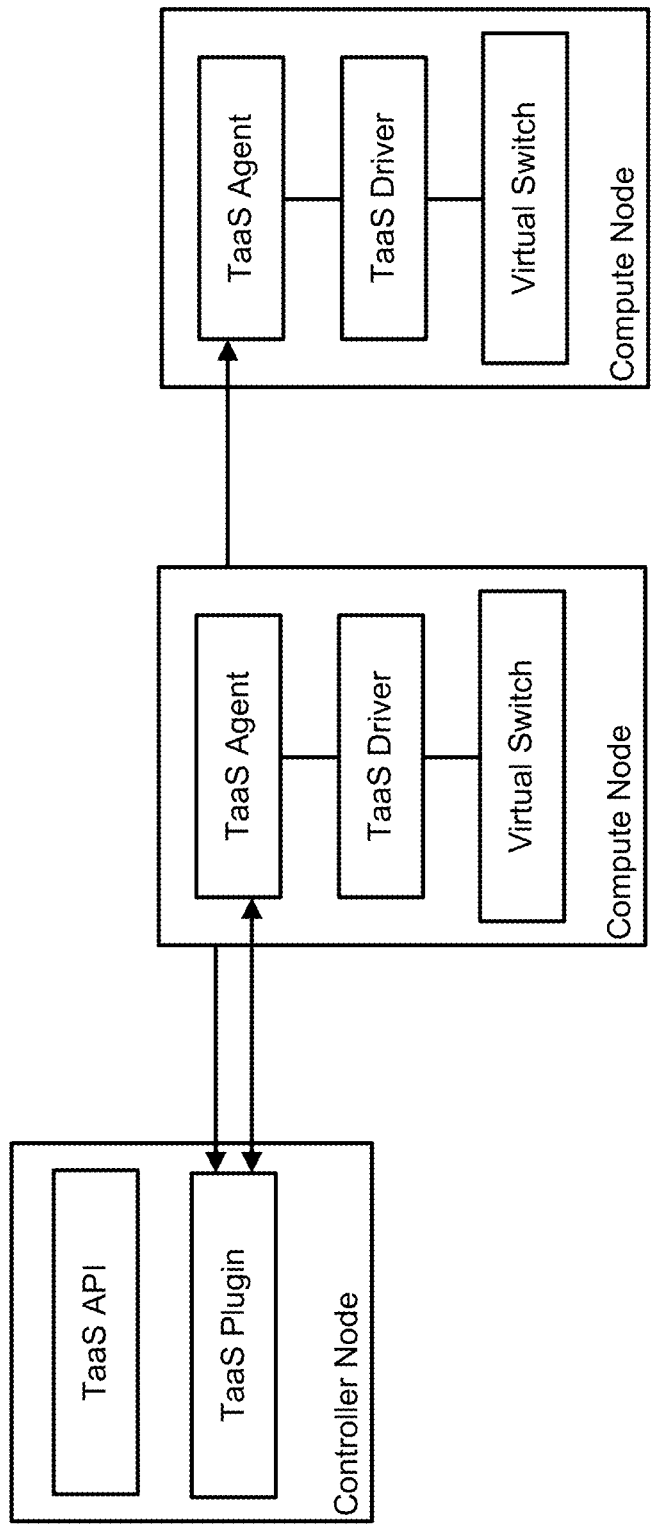
FIG. 2 depicts how Tap-as-a-Service (TaaS) may be used to implement a logical tap device in some embodiments.

Second, Tap-as-a-Service (TaaS) may be used to implement a logical tap device as shown in FIG. 2. TaaS may offer an application programming interface (API) that enables an end user or cloud administrator to monitor individual ports of virtual programmable switches within a shared virtual network. Because it is vital that end user boundaries are not compromised, a given end user can only monitor its own ports (i.e., any port on one of its private virtual networks or a port created by the given end user on a shared virtual network). Moreover, TaaS can enable more complex traffic visibility solutions to be engineered for a diverse set of use cases, including network administration, application troubleshooting, network security troubleshooting, data analytics, etc. However, the complex nature of successfully implementing TaaS generally limits it to operating as an extension of an open source cloud computing platform (or some other cloud computing platform that permits significant back-end infrastructure modification). TaaS may be thought of as a platform-oriented tapping service (i.e., rather than an agent-based tapping service). Such functionality must be supported and facilitated by the (proprietary) cloud (e.g., OpenStack).

Third, a tap device (also referred to as a "tapping agent" or an "agent") may reside entirely within the virtual machine it is responsible for monitoring. As further described below, such a deployment allows the agent to select, forward, and deliver virtual machine traffic flows of interest to a visibility platform that monitors virtual workloads. The agent may be configured to "tap" a virtual machine traffic flow and direct duplicate copies of data packets to the visibility platform, or dispatch the virtual machine traffic flow itself to the visibility platform.

Attempts have been made to employ traditional agent-based monitoring technologies for the type of in-depth traffic monitoring and management activities described above. However, traditional agent-based monitoring technologies often lead to very complex architectures when used in combination with public cloud infrastructures, especially if multiple network tools require access to the same virtualized traffic for inspection and analysis as shown in FIG. 1. For example, traditional agent-based monitoring technologies experience challenges such as:

An overabundance of discrete agents that increase the complexity of the virtual network as a whole;

Decreased workload performance of the public cloud infrastructure;

Degradation of virtual network (e.g., Virtual Private Cloud) throughput and performance due to duplicate traffic; and Reactive, static visibility of the virtual network that is subject to heavy disruption.

Figure 3:
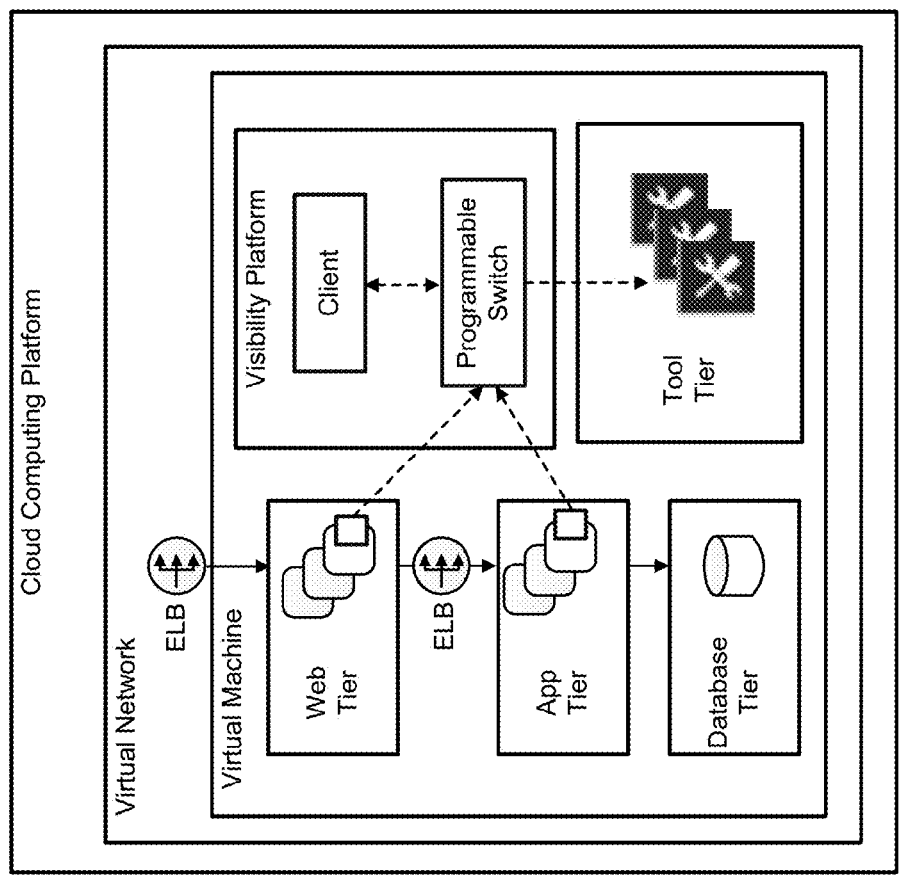
FIG. 3 depicts a visibility platform that addresses these challenges and can be used to provide consistent visibility into virtualized traffic traversing a public cloud architecture.

FIG. 3 depicts a network visibility appliance (also referred to as a "visibility platform") that addresses these challenges and can be used to provide consistent visibility into virtualized traffic traversing a public cloud architecture. Thus, the visibility platform may provide a coherent view of traffic in motion across the public cloud architecture for a given end user. The visibility platform may be used to provide a holistic view of data maintained across on-premise locations, remote sites, public clouds, private clouds, hybrid clouds, or some combination thereof. Such visibility enables the visibility platform to analyze traffic (i.e., perform risk analytics, security analytics, etc.) in a manner that wouldn't otherwise be possible.

The visibility platform may be implemented as a comprehensive visibility tier on a virtual network that is dedicated to the given end user's account with a cloud computing platform. Such a configuration ensures that consistent ways of accessing, categorizing, and consolidating the delivery of virtualized traffic to security tools and performance management tools continue to exist. Such a configuration also allows the visibility platform and each of these tools to be operable as in-band (i.e., "inline") devices or out-of-band devices. Out-of-band devices operate outside of the path of data traffic between an origination node and a destination node and receive copies of the data packets that make up the traffic, rather than the original data packets. Out-of-band devices are able to freely modify the copies of the data packets because the original data packets are allowed to traverse the virtual network unimpeded. Inline devices, on the other hand, operate within the path of data traffic between an origination node and a destination node and receive and forward the original data packets.

As further described below, the visibility platform enables several notable advantages, including:

A consistent way to access virtualized traffic traversing one or more virtual machines;

Effective distribution of virtualized traffic to one or more network tools;

An ability to customize which virtualized traffic is routed to which network tool(s) using traffic policies; and Delivery of an elastic, on-demand visibility as end user workloads scale out.

Other features and benefits can be found below in Table I.

TABLE I

Features available to various embodiments of the visibility platform.

| Feature | Benefits |
| --- | --- |
| Traffic Access | An agent can be deployed in the virtual machine of an end user to mirror selected traffic flows and deliver the traffic flows to one or more visibility platforms A single agent can replace multiple vendor-supplied agents and consistently access and forward virtualized traffic |
| Traffic Aggregation and Intelligence | A visibility platform (which may be available, for example, as an Amazon Machine Image) that can aggregate virtualized traffic from multiple agents Intelligence and optimization procedures can be applied to the aggregated virtualized traffic, including: Flow Mapping - Select and filter virtualized traffic Slicing - Reduce data packet size at a specified offset to conserve network backhaul Sampling - Conserve network backhaul by selecting data packet rates (e.g., 1 in 10 or 1 in 100) Masking - Ensure compliancy and privacy of the virtualized traffic by masking specific offsets Optimized traffic can then be distributed to cloud-based network tool(s) or backhauled to an on-premise environment using, for example, Internet Protocol (IP) or Generic Routing Encapsulation (GRE) tunnels |

TABLE I-continued

Features available to various embodiments of the visibility platform.

| Feature | Benefits |
| --- | --- |
| Orchestration | A centralized management application can be deployed either on-premise or in the cloud<br>The centralized management application may allow an end user to:<br>    Define traffic policies using a simple drag-and-drop user interface (UI)<br>    Integrate with APIs of a cloud computing platform to determine virtual network inventory<br>    Review monitoring service (e.g., Amazon CloudWatch) events to identify virtual network spin-up |
| Elastic and Automated Visibility (Automatic Target Selection) | Visibility platforms can be elastically scaled out based on virtualized traffic access points (i.e., agents)<br>New virtual machines can be automatically selected using traffic policies<br>Such a configuration allows for continuous and automated visibility, while identifying vertical and/or lateral progagation of threats |

Note that although references may be made here to a particular cloud computing platform (e.g., Amazon Web Services), the techniques described herein are equally applicable to any cloud computing cloud.

Visibility Platform Architecture

Figure 4:
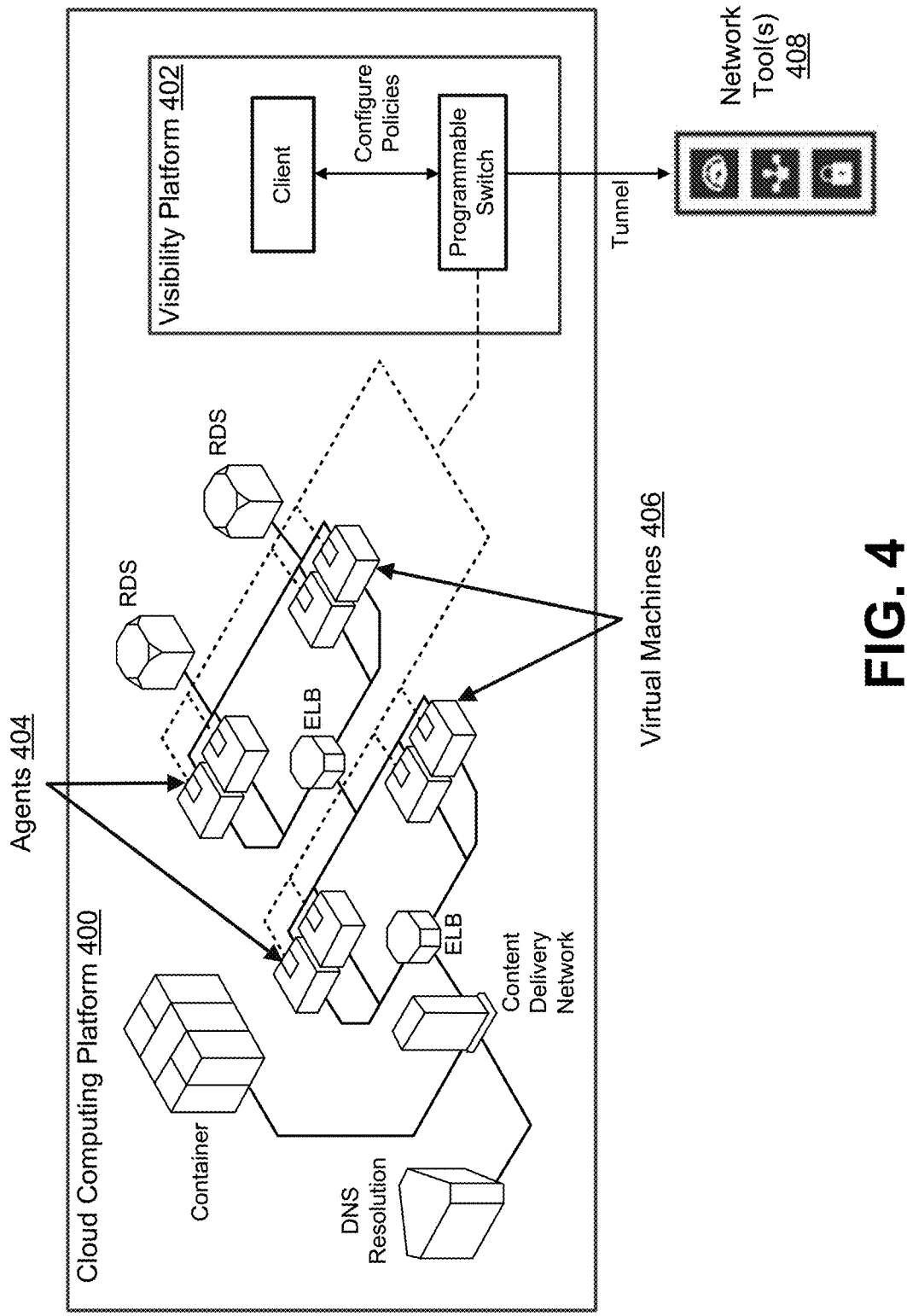
FIG. 4 depicts how a visibility platform can be integrated into a cloud computing platform to provide a coherent view of virtualized traffic in motion across the public cloud infrastructure for a given end user.

FIG. 4 depicts how a visibility platform 402 can be integrated into a cloud computing platform 400 to provide a coherent view of virtualized traffic in motion across the public cloud infrastructure for a given end user. By installing agents 404 on some or all of the virtual machines 406 belonging to the given end user, the visibility platform 402 can acquire data packets (or duplicate copies of the data packets) traversing the public cloud infrastructure for further analysis in order to improve visibility into possible security risks.

The network environment shown in FIG. 4 often involves three separate entities: (1) a provider who maintains the public cloud infrastructure needed to support or host the cloud computing platform 400; (2) a developer who monitors virtualized traffic traversing the cloud computing platform 400 to identify security risks; and (3) an end user (e.g., an individual or an enterprise) who employs the cloud computing platform 400 to run an application, store data, etc. Here, for example, the provider is responsible for managing a public cloud infrastructure, while the developer is responsible for managing the visibility platform 402.

In some embodiments, the visibility platform 402 is communicatively coupled to one or more network tools 408 for analyzing the virtualized traffic. These network tool(s) 408 can be hosted locally as part of the visibility platform 402 (i.e., on the cloud computing platform 400) or remotely (e.g., within an on-premise environment controlled by the end user). When the visibility platform 402 is entirely virtual, the visibility platform 402 establishes a tunnel for delivering the virtualized traffic to the network tool(s) 408 regardless of where the network tool(s) 408 reside. However, when the visibility platform 402 is physical (e.g., is comprised of a physical programmable switch), the visibility platform 402 may establish a tunnel only for those network tool(s) 408 that are hosted remotely (i.e., are not directly coupled to the visibility platform 402 using physical cables). A "tunnel" is a mechanism that can be used to reliably transmit traffic across a network. Before virtualized traffic is forwarded to the tunnel by the visibility platform 402 for transmission to the network tool(s) 408, the visibility platform 402 may create an outer jacket for the virtualized traffic (and any other network content) based on the type of tunnel. For example, an inner payload could be wrapped in an encapsulation by the visibility platform 402 in accordance with a Virtual Extensible LAN (VXLAN) or Generic Routing Encapsulation (GRE) protocol. The network tool(s) 408 can then remove the outer jacket upon reception and determine how the inner payload (i.e., the actual virtualized traffic) should be handled.

As further described below, the visibility platform 402 can exist as a cloud-native virtual machine (also referred to as an "unnative virtual machine") that analyzes virtualized traffic traversing the cloud computing platform 400. Accordingly, the visibility platform 402 may not be limited by the computer hardware responsible for supporting the cloud computing platform.

Figure 5:
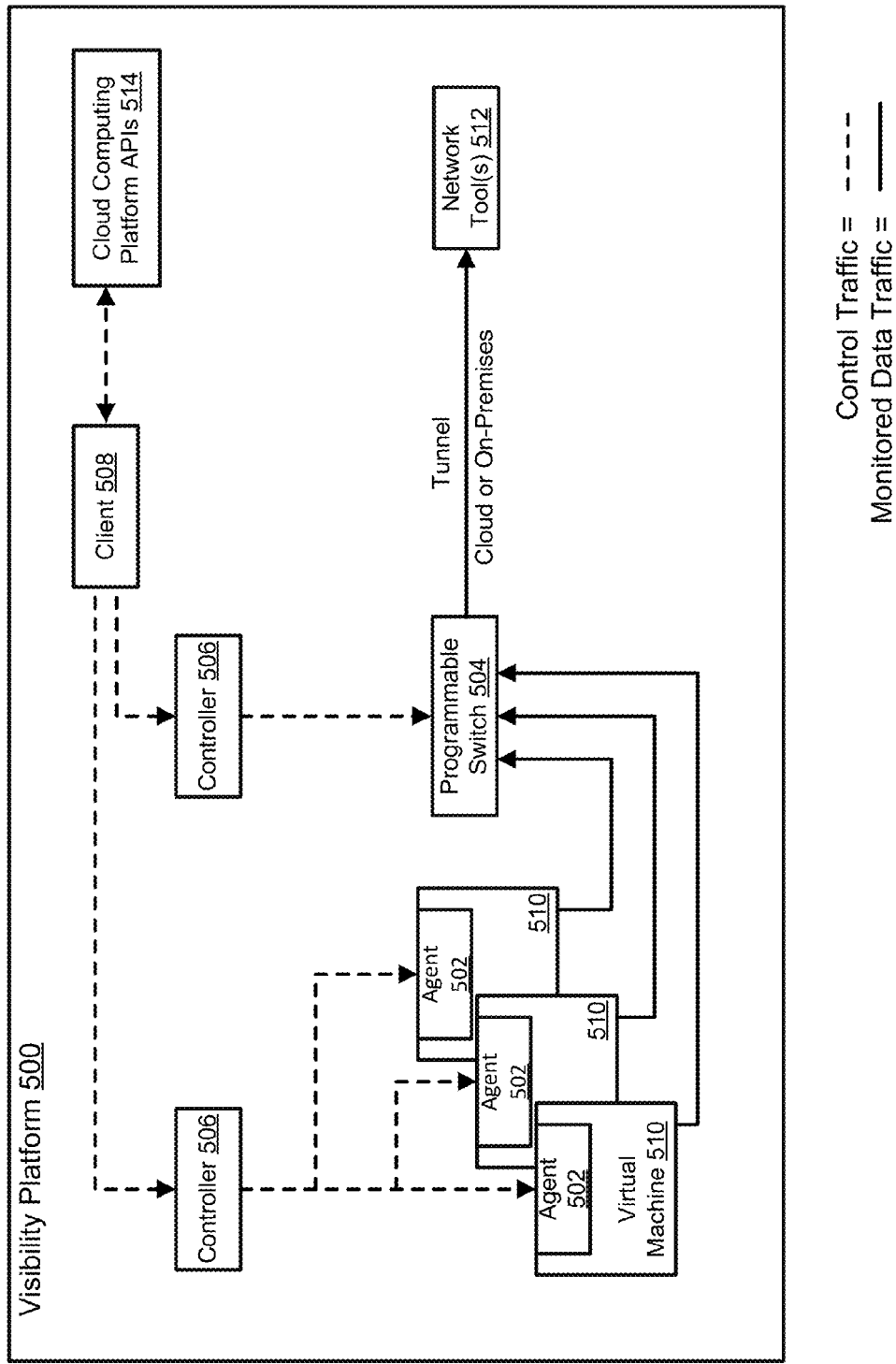
FIG. 5 depicts one embodiment of a visibility platform that can be run entirely within a cloud environment or a non-cloud environment (e.g., as a virtual machine).

FIG. 5 depicts one embodiment of a visibility platform 500 that can be run entirely within a cloud environment or a non-cloud environment (e.g., as a virtual machine). Thus, the visibility platform 500 may be hosted on the cloud computing platform, run on a dedicated piece of computer hardware (e.g., a monitoring platform that includes a chassis and interchangeable blades offering various functionalities, such as enhanced packet distribution and masking/filtering capabilities), or some combination thereof. For example, the visibility platform 500 could reside on a stand-alone personal computer, a dedicated network server, or some other computing device having an x86 instruction set architecture.

Note, however, that it is often desirable to run the visibility platform 500 as a virtual machine on the cloud computing platform (e.g., cloud computing platform 400 of FIG. 4). For example, the visibility platform 500 may exist inside of a Virtual Private Cloud (VPC) that resides within a dedicated section of an end user's virtual network within Amazon Web Services. Such an arrangement permits the visibility platform 500 to intelligently optimize, filter, and analyze virtualized traffic across hundreds or thousands of virtual machines. Note, however, that the visibility platform 500 may also exist outside of the VPC.

Several advantages exist when the visibility platform 500 is deployed on the cloud computing platform. For example, additional computing devices and/or virtual machines can be seamlessly added in a dynamic fashion to increase the number of processors (also known as virtual CPUs), add storage devices, etc. Similarly, these computing device(s) and/or virtual machine(s) can be easily removed when they are no longer needed. Virtual implementation also enables the visibility platform to take advantage of any software or hardware acceleration techniques implemented by the provider or the end user. For example, the visibility platform 500 can leverage PCI passthrough if supported by the cloud provider and enabled by the end user and/or the developer.

The visibility platform 500 includes one or more agents 502 for mirroring virtualized traffic traversing a cloud computing platform, a programmable switch 504 (also referred to as a "switching engine") for aggregating and filtering the virtualized traffic, one or more controllers 506, and a client 508 for managing the visibility platform 500 as a whole. Other embodiments may include a subset of these components.

As shown here, each agent 502 is fully contained within a corresponding target virtual machine 510 whose virtualized traffic is to be monitored. While the agent(s) 502 serve requests issued by the controller(s) 506, each agent 502 is responsible for configuring its own interface mirrors, tunnels, etc.

The programmable switch 504 may be a physical or virtual switch, such as a software-defined networking (SDN)

switch. The programmable switch 504 is responsible for aggregating virtualized traffic mirrored by the agent(s) 502, and then forwarding at least some of the aggregated virtualized traffic to one or more network tools 512 for further analysis. In some embodiments, the programmable switch 504 may filter (e.g., slice, mask, or sample) and/or replicate the aggregated virtualized traffic before forwarding it downstream to the network tool(s) 512.

The controller(s) 506, meanwhile, may be controllable by the end user via the client 508, which may be hosted on the cloud computing platform on in an on-premises environment controlled by the end user. Together, the client 508 and the controller(s) 506 enable centralized management of the visibility platform 500 as a whole. For example, the client 508 may be configured to integrate with one or more APIs 514 offered by the cloud computing platform in order to retrieve relevant information about the virtualized traffic being monitored (e.g., end user credentials, virtual machine addresses, virtualized traffic characteristics). In some embodiments, the client 508 supports a drag-and-drop user interface that can be used by the end user to create and implement traffic policies. Moreover, the client 508 may provide traffic policy stats to the end user or an administrator (e.g., the manager of the visibility platform) for troubleshooting in real time.

Figure 6:
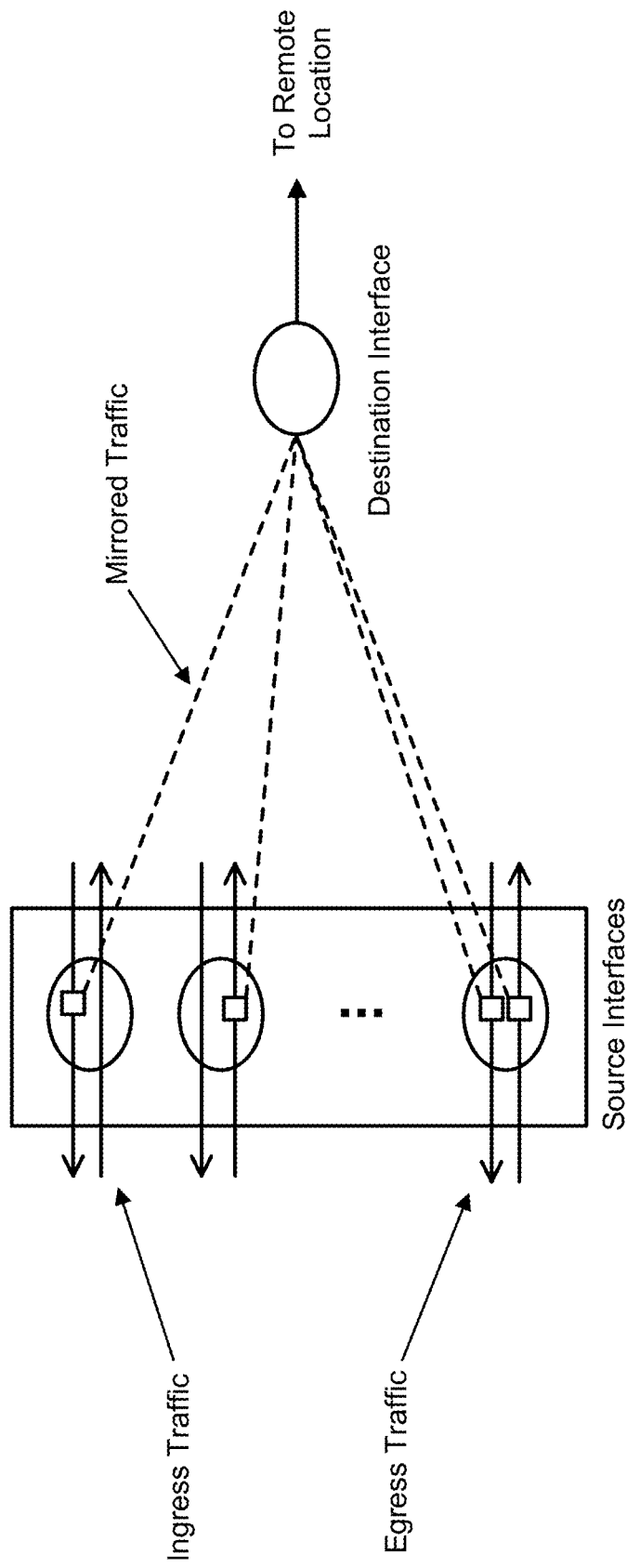
FIG. 6 depicts how agents can be configured to monitor and mirror ingress traffic (i.e., traffic entering a virtual machine) and/or egress traffic (i.e., traffic leaving the virtual machine).

FIG. 6 depicts how agents can be configured to monitor and mirror ingress traffic (i.e., traffic entering a virtual machine) and/or egress traffic (i.e., traffic leaving the virtual machine). Said another way, the agent(s) can be configured to dispatch virtualized network traffic from one or more source interfaces (e.g., virtual ingress or egress ports) to a destination interface for transmission downstream for further analysis.

In some embodiments, each interface must be registered with the corresponding agent before it can be used as a source interface in order to ensure the end user associated with the virtual machine has authority over the source interface(s). APIs may be available to register and/or unregister the interface with the corresponding agent. Usage permissions (which may be specified during interface registration) can be used to dictate how an agent may use an interface.

Note that it is often desirable to filter out unwanted virtualized traffic as far upstream as possible so that only the data packets or traffic flows of interest are delivered to an intended receiver (e.g., a programmable switch). Upstream filtering can greatly alleviate traffic monitoring overhead by reducing the work involved in duplicating data packets and reducing the bandwidth consumed in delivering virtualized traffic to the intended receiver. One possible location for introducing filters in the traffic monitoring workflow is immediately prior to data packet capture (i.e., before mirroring or routing by an agent).

Accordingly, in some embodiments, an agent may apply packet filters to the virtualized traffic seen by a given source interface. In such embodiments, only data packets that match the filter are mirrored (i.e., duplicated and delivered) to the destination interface. Packet filters can be expressed using maps that can be applied to data packets. A map (M) is a collection of one or more rules that is considered a "match" if any of the rules has a match.

$$M = R_1 \vee R_2 \ldots \vee R_n$$

A rule (R) includes one or more rule components that must be simultaneously satisfied.

$$R = r_1 \wedge r_2 \wedge \ldots \wedge r_m$$

A rule component (r) is a specific filtering criteria for matching packets (e.g., based on addresses, protocols, ports, or some other packet criteria).

The ingress traffic and egress traffic seen at the given source interface could be filtered using the same map or different maps. Note that because the agent(s) reside entirely within virtual machine(s) that are controlled by the end user, the implementation shown in FIG. 6 can be fully contained inside the virtual machine(s) being monitored. Consequently, the cloud computing platform may be unaware that virtualized traffic is being monitored (though the cloud computing platform will observe that virtualized traffic is exiting the virtual machine).

Figure 7:
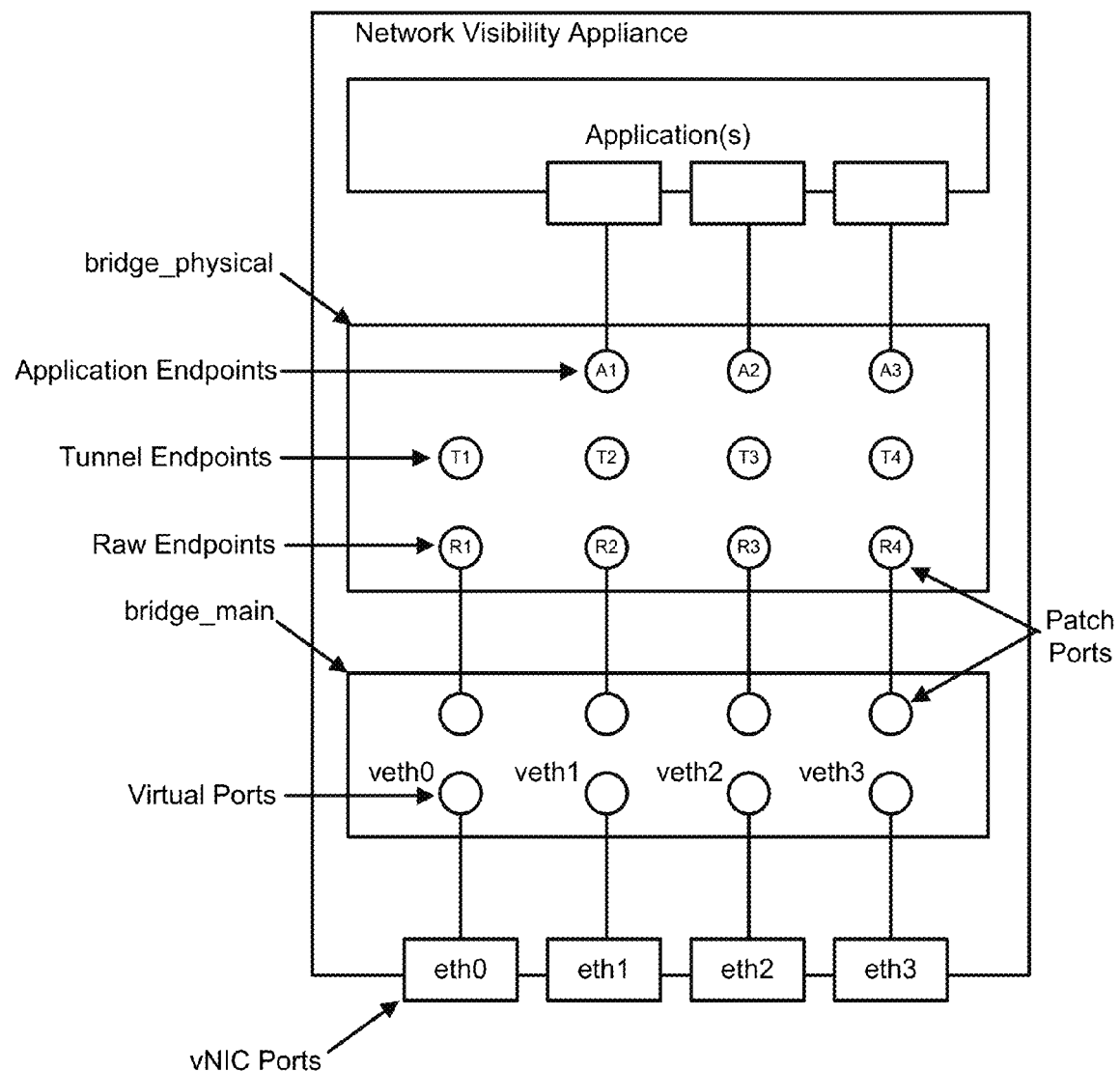
FIG. 7 depicts one embodiment of a network visibility appliance that may be executed by a visibility platform.

FIG. 7 depicts one embodiment of a programmable switch (also referred to as a "switching engine") that may be executed by a visibility platform. Although several of the examples provided below may be described in the context of virtual programmable switches (e.g., Open vSwitch, VMware NSX), the same techniques are equally applicable to physical programmable switches (e.g., a Broadcom packet processor).

The programmable switch includes one or more ports (e.g., eth0, eth1, eth2, and eth3) for receiving virtualized traffic that has been tapped or forwarded from a cloud computing platform. Each port represents a Network Interface Card (NIC) or virtual Network Interface Card (vNIC). In the case of a virtual programmable switch, each port is created, cleared, and/or deleted by an API. Said another way, a new virtual programmable switch will not have any ports upon installation. Instead, the port(s) must be dynamically created by the programmable switch and an API is assigned to each port. A physical programmable switch includes a fixed number of ports (though additional ports could be added by installing a new blade or card within the programmable switch). Thus, the programmable switch will have one or more (v)NICs regardless of whether the programmable switch is implemented in software or physical hardware.

The programmable switch manages virtualized traffic coming into these port(s) using rules (also referred to as "flow entries" or "access control lists") that dictate whether incoming virtualized traffic should be dropped or routed to another node within the visibility fabric (e.g., another programmable switch). These rules are typically maintained within a flow table that is accessible to the programmable switch. Generally, the flow table is exposed to a controller (e.g., controller 506 of FIG. 5) that can be used to insert, remove, and/or modify filters or flows.

In order to properly route incoming traffic, the programmable switch (e.g., Open vSwitch or VMware NSX for virtual embodiments, Broadcom packet processor for physical embodiments) must be compatible with the port(s) and have access to a programmable flow table. For example, when the programmable switch is implemented entirely in software, the programmable flow table can be represented as a series of tables. Unlike physical programmable switches, virtual programmable switches are not limited to a single table (e.g., a single ternary content-addressable memory (TCAM)). Software implementation permits rules to be intelligently distributed across multiple virtual programmable switches. Different tables may include different types of information.

As shown in FIG. 7, in some embodiments the programmable switch is split into multiple bridges (e.g., bridge_physical and bridge_main). The presence of multiple bridges will typically simplify the underlying architecture of the programmable switch (and the relationship between various ports of the programmable switch). However, the programmable switch need not be split into multiple bridges. In fact, in some instances it may be desirable to work with only one bridge.

Each virtual port created by the programmable switch can be given a unique Internet Protocol (IP) address for management purposes. Generally, the programmable switch will not assign IP addresses to any physical ports because they could be (and often are) shared by multiple virtual machines. After unique IP addresses have been assigned to the virtual port(s), the programmable switch can completely ignore whether physical ports exist. Instead, the programmable switch can interface directly with virtual port(s) constructed by API(s).

In some embodiments, the programmable switch is communicatively coupled to a controller (e.g., controller 506 of FIG. 5) across a network. The controller could be, for example, a remote SDN controller (e.g., OpenDaylight) that implements traffic policies within the programmable switch. Together with a client (e.g., client of FIG. 5), the controller may allow an end user or an administrator to manage multiple programmable switches (and thus multiple virtual machines or physical computing devices).

The network visibility appliance (also referred to as a "visibility platform") of which the programmable switch is a part may also include one or more applications for creating, aggregating, filtering, and modifying traffic. For example, each application may reside within a separate program container when the network visibility appliance is constructed in Linux. Each program container can be communicatively coupled to a bridge (e.g., bridge_main) that is responsible for routing incoming traffic to the appropriate application(s).

FIG. 7 depicts several different kinds of objects (e.g., raw endpoints, tunnel endpoints, maps, and application programs) that allow the programmable switch to monitor virtualized traffic. More specifically, the programmable switch may be configured to filter virtualized traffic (e.g., selecting virtualized traffic of interest by matching against specified criteria defined in maps), manipulate virtualized traffic (e.g., by performing operations such as slicing, masking, de-duplication, and compression), and/or transport virtualized traffic (e.g., by receiving and dispatching virtualized traffic to network tool(s) for further analysis). A programmable switch may include raw endpoints that receive traffic directly from (v)NICs and tunnel endpoints that send/receive traffic to/from remote locations. Tunnel endpoints are created by the switching engine using APIs and are associated with a remote endpoint and specific type (e.g., VXLAN or GRE).

The programmable switch may also include one or more application endpoints that send/receive packets to/from application programs (also referred to as "applications"). Applications may be responsible for creating, aggregating, filtering, and/or modifying the virtualized traffic received by a programmable switch. Examples of applications can include masking programs, deep packet inspection programs, net flow generation programs, etc.

Virtualized traffic can be received by the programmable switch at raw endpoints, tunnel endpoints, and application endpoints, while virtualized traffic can be output at tunnel endpoints and application endpoints. Raw endpoints, therefore, can only receive incoming virtualized traffic, while tunnel endpoints and application endpoints are generally bi-directional (i.e., can receive and transmit virtualized traffic across different ingress and egress interfaces). Raw endpoints are illustrated as the lowermost endpoints in FIG. 7 because they receive virtualized traffic directly from (v)NICs. However, tunnel endpoints are often the predominant way to route virtualized traffic away from the programmable switch (e.g., into an on-premises environment that includes one or more network tools). Although application endpoints route virtualized traffic into an environment managed by an application, the environment still resides within the programmable switch as shown in FIG. 7.

Figure 8:
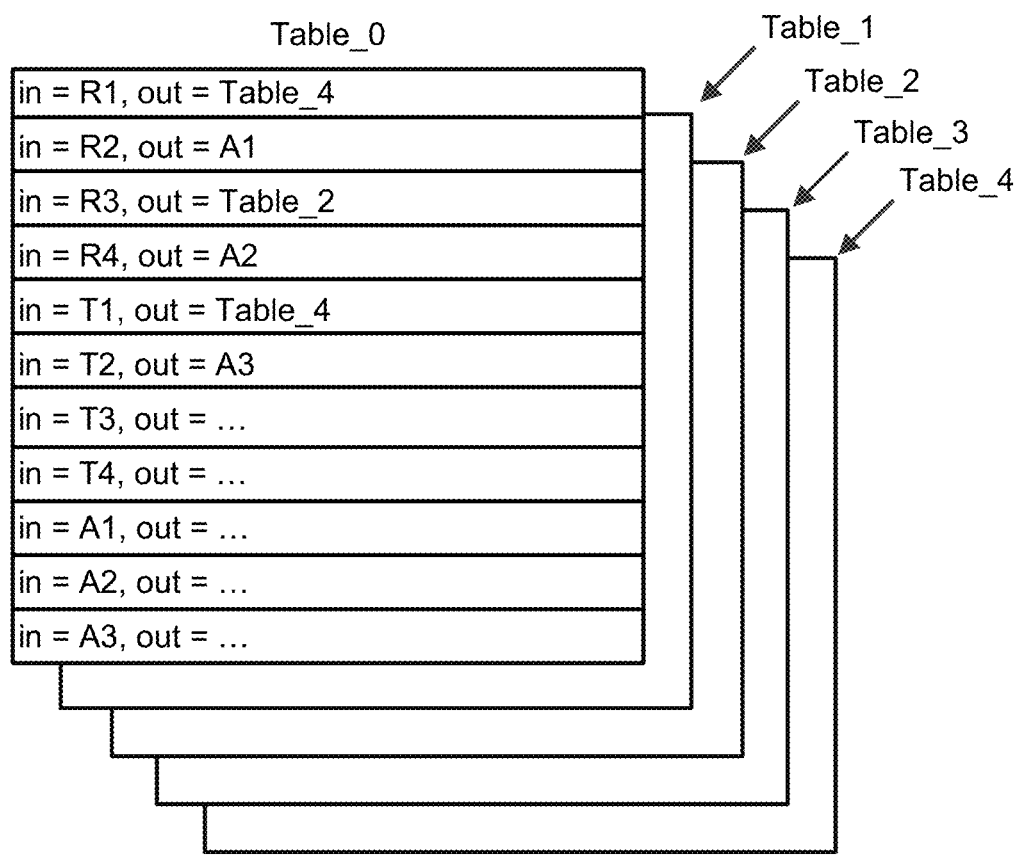
FIG. 8 depicts an example of a series of programmable flow tables that can be used by a network visibility appliance to route virtualized traffic.

FIG. 8 depicts an example of a series of programmable flow tables that can be used by a programmable switch to route virtualized traffic. Each interface capable of receiving incoming traffic (i.e., each raw endpoint, tunnel endpoint, and application endpoint) is represented by a row in Table_0. These interfaces can also be referred to as possible "ingress points." Thus, Table_0 is responsible for initially routing all incoming virtualized traffic to either a tunnel endpoint, an application endpoint, or a map (which requires the corresponding entry list another table). In some embodiments, the programmable switch maintains statistics regarding how virtualized traffic is routed between the various ingress and egress points.

Figure 9:
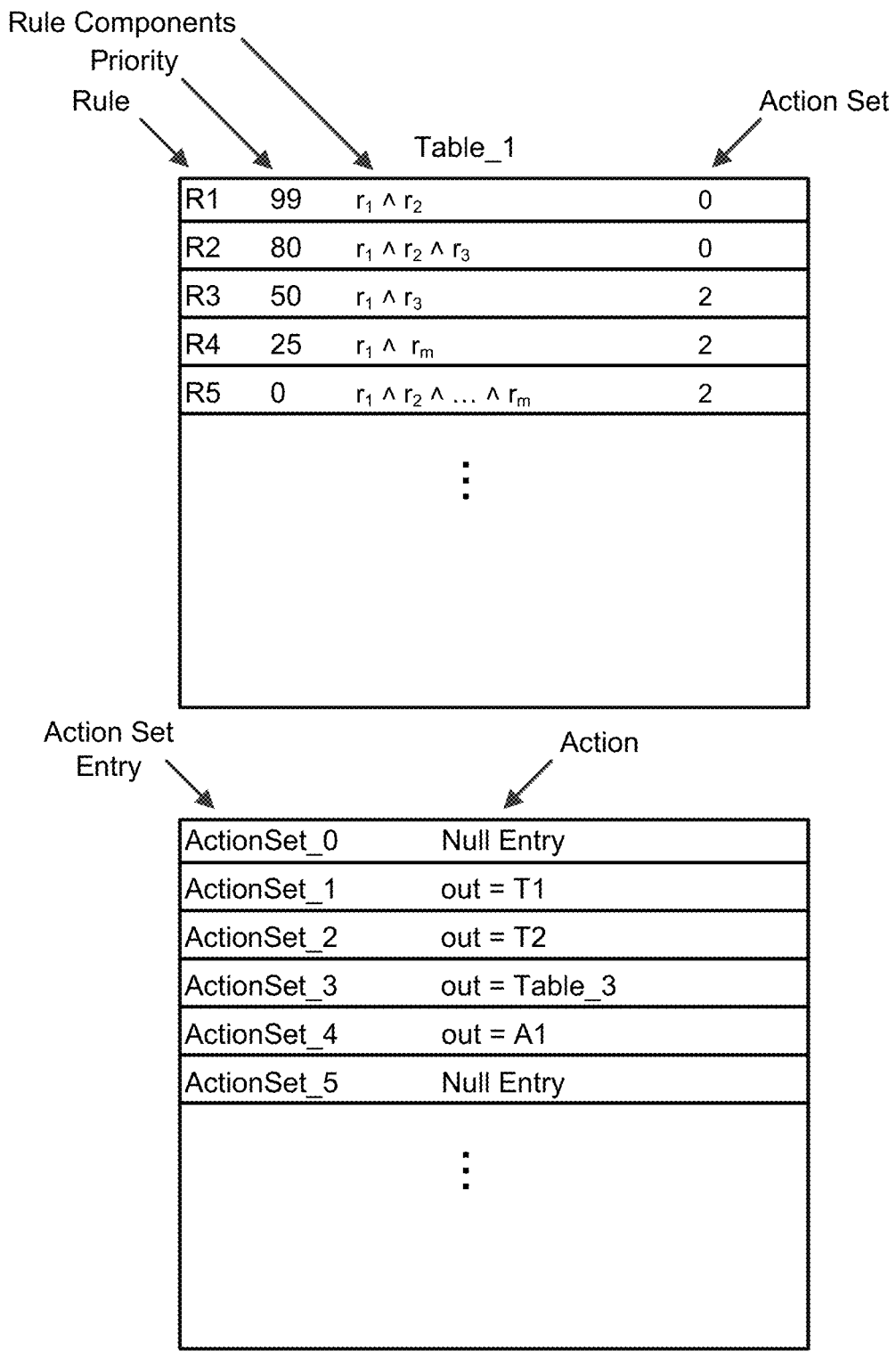
FIG. 9 depicts an example of a programmable flow table for a map.

Each map is represented by its own table (e.g., Table_1, Table_2, Table_3, and Table_4). FIG. 9 depicts an example of a programmable flow table for a map. The number of lines in the programmable flow table (which is generally on the order of hundreds or thousands) defines how many rules are allowed in the map.

As noted above, a map is a collection of one or more rules that is considered a "match" if any of the rules has a match, and, as shown in FIG. 9, the programmable flow table specifies what will happen if any of the rules result in a match. The outcome (also referred to as an "action set") may specify, for example, that matching data packets should be dropped or routed to a specific tunnel endpoint or application endpoint.

FIG. 9 also depicts an example of a programmable flow table that includes the action set(s) for a map. An action set is a group of one or more actions that must be applied together. Each action set can specify one of several different actions to be performed if application of the rule results in a match. For example, if the action set is an empty set or a null set (i.e., does not include an affiliated action), then the programmable switch treats the action set as a conclusive drop rule. Accordingly, all matching data packets are dropped by the programmable switch. As another example, the action set may have another node associated with it (e.g., a tunnel endpoint or an application endpoint). In such instances, the programmable switch can direct matching data packets to the specified node (which causes the traffic to be routed to the node and once again be governed by Table_0). The action set may also specify that virtualized traffic matching a given rule should be forwarded to another map (e.g., ActionSet_3 causes traffic to be forwarded to Table_3, which represents another map). Virtualized traffic can also be replicated as necessary when leaving a node that has more than one outgoing edge (i.e., when the action set specifies multiple destination nodes).

Multiple rules may be associated with a single action set. Here, for example, rules one (R1) and two (R2) are affiliated with ActionSet_0, while rules three (R3), four (R4), and five (R5) are affiliated with ActionSet_2. Generally, these links to the action sets are fixed once the map has been constructed and programmed into the programmable switch. However, because each map is assigned to its own table, an end user or administrator may be able to easily add, remove, or modify maps by simply adding new tables, removing existing tables, or modifying entries in existing tables.

In some embodiments, each map rule is assigned a specific priority. Priorities can range from 0-99, where a larger number denotes a higher priority. Higher priority rules can then be evaluated before lower priority rules, although no specific execution order may be guaranteed for rules having the same priority.

The links described above between the various programmable flow tables are generally simple, passive links. However, in some embodiments, the links may be made more intelligent. For example, the programmable switch may add quality of service (QOS) policies to certain links, stamp incoming data packets with particular metadata (e.g., a timestamp), modify the IP addresses of outgoing data packets, etc.

Note that the same techniques could be implemented using a single table that is partitioned into multiple (logical) zones. For example, a first group of rows may be allocated to the interfaces capable of receiving incoming virtualized traffic, while a second group of rows is allocated to a first map, and a third group of rows is allocated to a second map.

Distributed Visibility Fabric

As noted above, a visibility platform can reside within a physical appliance (e.g., including a physical programmable switch such as a Broadcom packet processor) or a virtual machine (e.g., including a virtual programmable switch such as Open vSwitch or VMware NSX). However, in some instances a single visibility platform is not, by itself, very useful. Instead, better network visibility may be achieved by deriving traffic information from hundreds or thousands of visibility platforms.

Figure 10:
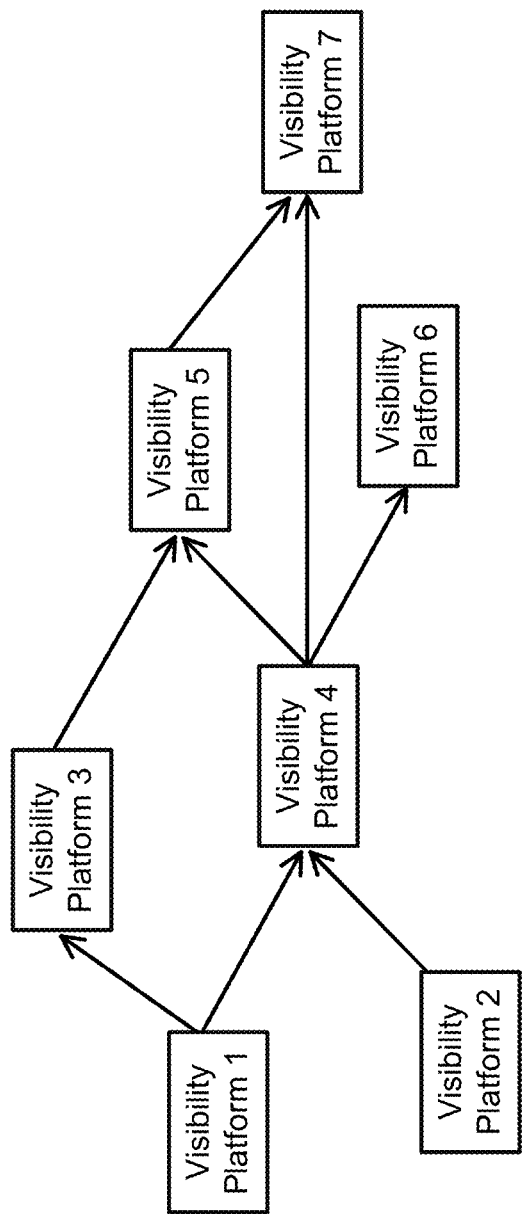
FIG. 10 depicts one example of a distributed visibility fabric of multiple visibility platforms.

FIG. 10 depicts one example of such a distributed visibility fabric of multiple visibility platforms. An end user (e.g., an individual or enterprise) may interact with the distributed visibility fabric via a user interface, which includes high-level representations of each visibility platform. A developer can then map the individual nodes of each visibility platform onto a series of programmable switches. This allows certain network objects (e.g., maps) to be intelligently distributed amongst the series of programmable switches. Moreover, if virtualized traffic must go from one node to another node (i.e., from one programmable switch to another programmable switch), the developer can cause the two nodes to be patched together to form an appropriate connection. Several advantages provided by the distributed visibility fabric can be seen in the use cases described below.

A single visibility platform (e.g., the visibility platforms of FIGS. 3-4) can be used to provide pervasive visibility into the virtualized traffic traversing a cloud computing platform that is accessed by one or more agents and programmable switches. Accordingly, the visibility platform can be used to provide greater clarity into the traffic within on-premise environments, private cloud environments, public cloud environments, hybrid cloud environments, and multi-virtual network deployments. The visibility platforms described here can be implemented in such a manner as to support numerous real-world, flexible deployment models.

Figure 11:
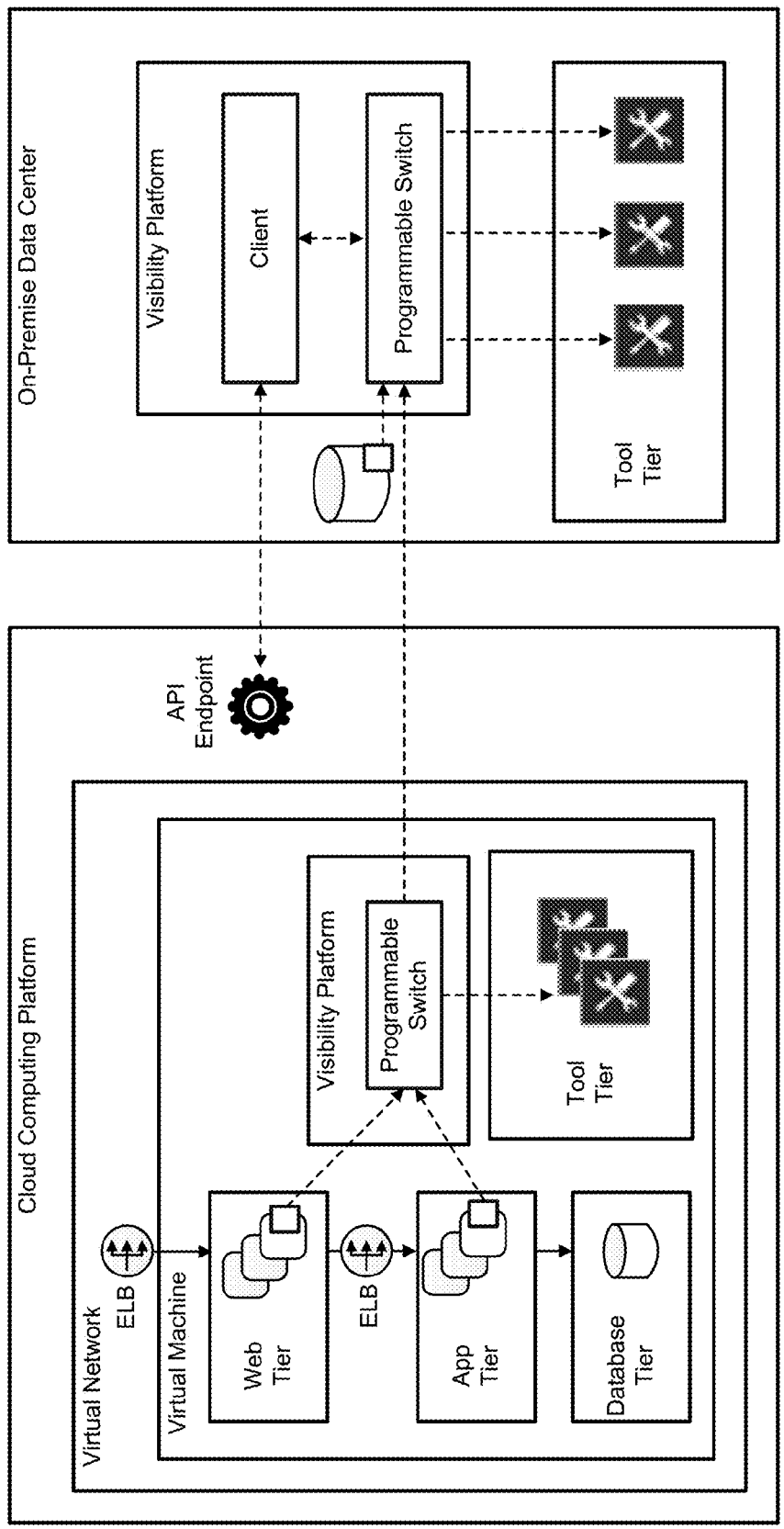
FIG. 11 depicts a deployment model that may be used by a hybrid cloud infrastructure for an end user (e.g., a large enterprise).
Figure 12:
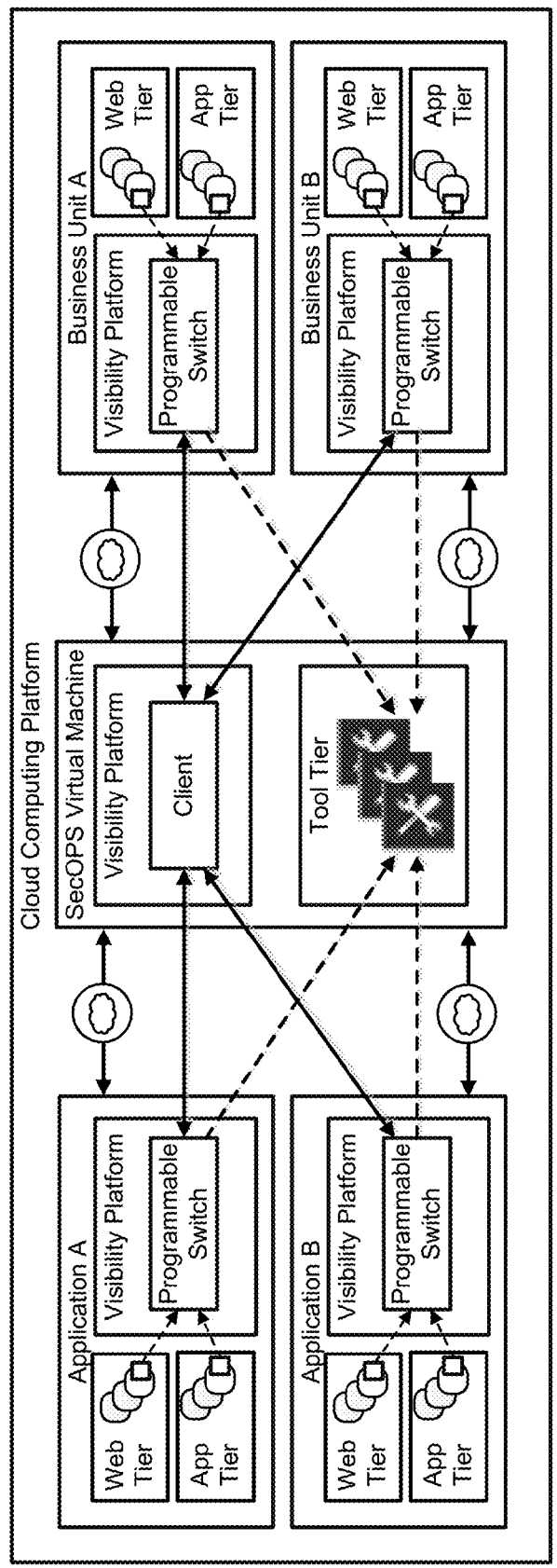
FIG. 12 depicts a series of visibility platforms that reside within different virtual networks in a single cloud computing region.

FIGS. 11 and 12 depict several different use cases for the visibility platforms described above, and each of these use cases is described in greater depth below. Although FIGS. 11 and 12 may refer to a particular cloud computing service (e.g., Amazon Web Services), the techniques and architectures described herein can be used with any cloud computing platform.

FIG. 11 depicts a deployment model that may be used by a hybrid cloud infrastructure for an end user (e.g., a large enterprise). More specifically, a remote visibility platform resides within a virtual network (e.g., a Virtual Private Cloud) of a cloud computing platform and is communicatively coupled to a local (e.g., on-premise) visibility platform that resides within an environment controlled by the end user. The remote visibility platform is configured to tap virtualized traffic traversing the cloud computing platform and route some or all of the virtualized traffic back to the local visibility platform for further analysis. This may be accomplished using a tunnel that is constructed using one or more APIs that expose the remote visibility platform and the local visibility platform at each end. Such an embodiment may provide on-premise visibility while preserving end user investment into one or more network tools that are accessible to the local visibility platform.

FIG. 12, meanwhile, depicts a series of visibility platforms that reside within different virtual networks in a single cloud computing region. Such an arrangement may be used to provide centralized visibility for multi-virtual network deployments. For example, the design shown here could be used for public cloud infrastructures that have multiple virtual networks for different applications, business units, end users, etc. Enterprises who have migrated and/or deployed all of their applications to a cloud computing platform (either public or private) are typically said to be following an all-in approach (and may be referred to as "all-in-the-cloud enterprises").

In such embodiments, a centralized virtual network that is managed by, for example, a security operations (SecOps) team can be used for security or analytics, thereby eliminating the requirement that each virtual network host a separate tool tier for one or more network tools. An end user may also be able to utilize a network connection between multiple virtual networks (e.g., using Amazon Web Services VPC Peering) to route virtualized traffic and save network costs for central traffic inspection and analysis. Thus, implementation of the visibility platform design shown in FIG. 12 can reduce network tool proliferation while allowing for effective, centralized visibility for an all-in-the-cloud enterprise.

Virtualized Traffic Acquisition

Figure 13:
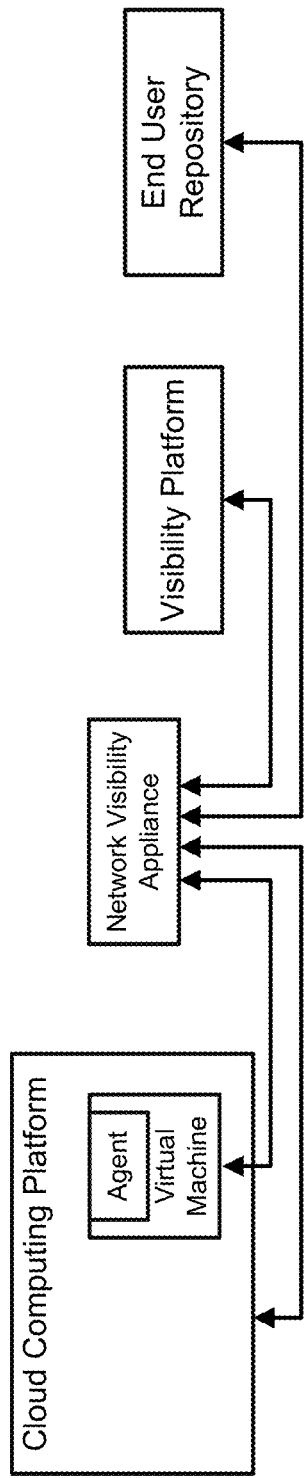
FIG. 13 depicts how a single network visibility appliance can sequentially or simultaneously receive virtualized traffic from different sources.

FIG. 13 depicts how a single programmable switch (which is part of a visibility platform) can sequentially or simultaneously receive virtualized traffic from different sources. First, as described above, the programmable switch may receive virtualized traffic from an agent that resides within a virtual machine managed by an end user.

Second, the programmable switch may receive virtualized traffic directly from the cloud computing platform. The cloud computing platform may create the virtualized traffic via, for example, a port mirroring process. In such embodiments, no agent is necessary, and the virtualized traffic can be delivered to the programmable switch at a raw endpoint.

Third, the programmable switch may receive virtualized traffic directly from the end user (or another third party) via some other means. For example, the end user may manage a database or repository that includes data packets previously captured by a firewall or data packets associated with a specific enterprise workgroup (e.g., engineering or marketing). In such embodiments, the virtualized traffic can be delivered to the programmable switch at a tunnel endpoint.

Finally, the programmable switch may receive virtualized traffic from another visibility platform (and, more specifically, another programmable switch of the other visibility platform). Multiple visibility platforms may be cascaded together for several reasons. For example, each of the visibility platforms may be running in a different geographical region. As another example, each of the visibility platforms may be configured to monitor traffic of different types (e.g., Hypertext Transfer Protocol (HTTP) and Secure Shell (SSH)).

Virtualized Traffic Monitoring

Figure 14:
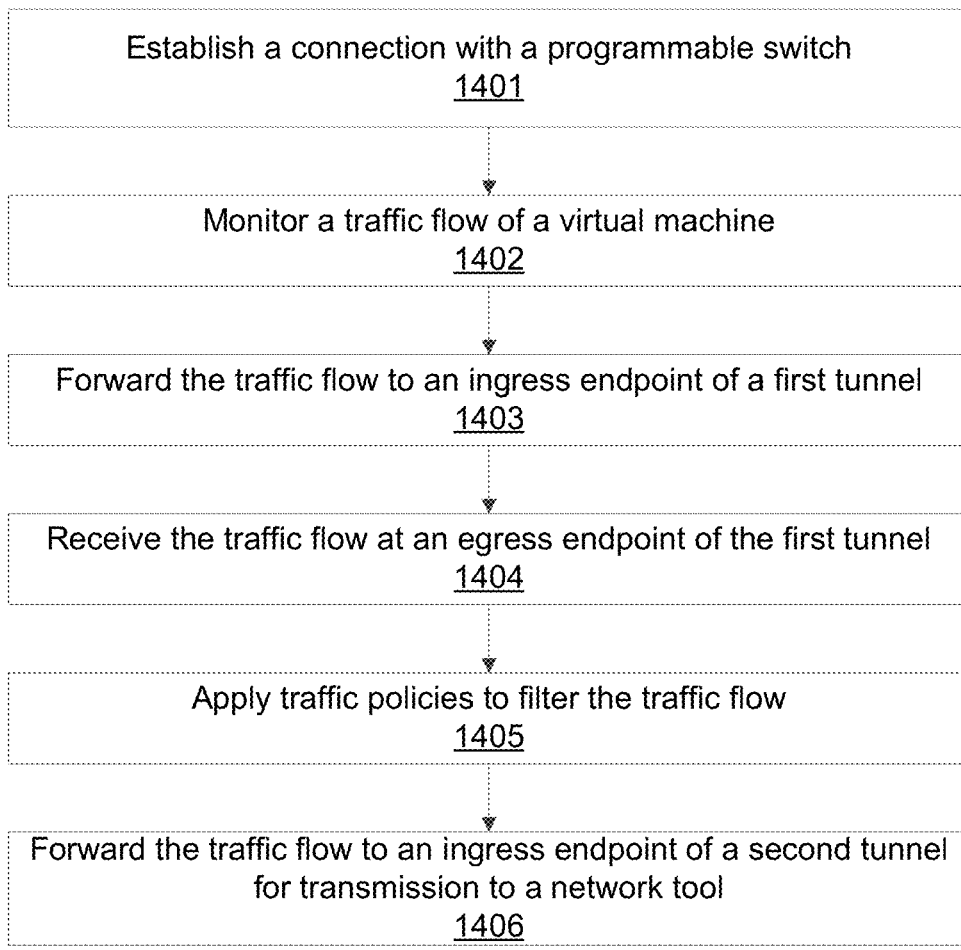
FIG. 14 depicts a process for monitoring the virtualized traffic of a virtual machine residing on a cloud computing platform.

FIG. 14 depicts a process 1400 for monitoring the virtualized traffic of a virtual machine residing on a cloud computing platform. An agent hosted by the virtual machine initially establishes a connection with a programmable switch of a visibility platform (step 1401). For example, the agent may establish a first tunnel between itself and the programmable switch in accordance with a specified tunnel protocol (e.g., VXLAN or GRE). The agent can then begin monitoring a traffic flow of the virtual machine (step 1402). In some embodiments, the traffic flow is one of multiple traffic flows monitored by the agent. The agent can then forward the traffic flow to an ingress endpoint of the first tunnel (step 1403).

Upon receiving the traffic flow at an egress endpoint of the first tunnel (step 1404), the visibility platform can begin monitoring the traffic flow. In some embodiments, the visibility platform removes an encapsulation placed on each data packet by the agent in accordance with the specified tunnel protocol. The visibility platform may also apply one or more traffic filters to filter data packets from the traffic flow (step 1405). These traffic filters may be represented as maps.

The programmable switch of the visibility platform can then forward the filtered traffic flow to an ingress endpoint of a second tunnel for transmission downstream to a network tool for further analysis (step 1406). As noted above, when the visibility platform is entirely virtual, the visibility platform establishes a tunnel for delivering the virtualized traffic to the network tool regardless of where the network tool resides. However, when the visibility platform is physical (e.g., is comprised of a physical programmable switch), the visibility platform may establish a tunnel only if the network tool is hosted remotely (i.e., is not directly coupled to the visibility platform using a physical cable). Thus, in some embodiments, the network tool resides within the same environment as the programmable switch, which renders the second tunnel unnecessary.

FIG. 15 depicts a process 1500 for extending an end user's on-premise visibility platform to a cloud computing infrastructure, as shown in FIG. 11. A local visibility platform is initially integrated with one or more cloud computing platform APIs to identify inventory of the cloud computing platform (e.g., within virtual machines managed by the end user) and the network configuration (step 1501). The local visibility platform can then selectively access virtualized traffic traversing the cloud computing platform using a remote visibility platform that resides on the cloud computing platform (step 1502).

In some embodiments, the remote visibility platform aggregates virtualized traffic and filters the virtualized traffic by applying one or more traffic intelligence measures (also referred to as a "traffic policy" or "traffic filters") (step 1503). For example, the traffic intelligence measure(s) may be applied by a service-chained set of visibility platforms. The remote visibility platform may also optimize the aggregated virtualized traffic, for example, by slicing the virtualized traffic to conserve network backhaul (step 1504). In some embodiments, privacy and compliance is further ensured by masking the virtualized traffic before the backhaul to the local visibility platform (step 1505). A tunnel may be established between the remote visibility platform and the local visibility platform that represents a backhaul connection (step 1506), and the remote visibility platform may route the aggregated and optimized virtualized traffic along the tunnel to the local visibility platform that resides within an on-premise environment controlled by the end user (step 1507).

Unless contrary to physical possibility, it is envisioned that the steps described above may be performed in various sequences and combinations. For example, the tunnel may be established between the remote visibility platform and the local visibility platform before virtualized traffic is tapped or dispatched from the cloud computing platform. Other steps could also be included in some embodiments.

Processing System

Figure 16:
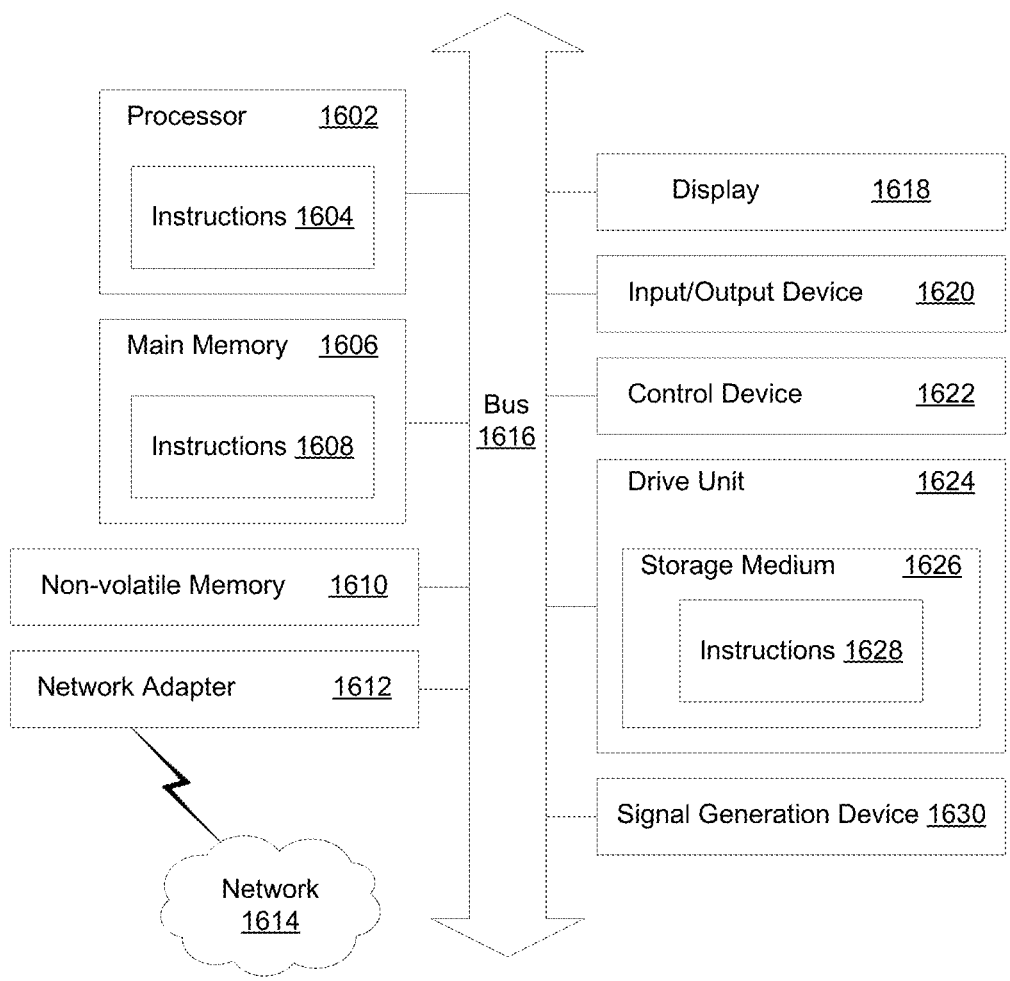
FIG. 16 is a high-level block diagram illustrating an example of a processing system in which at least some operations described herein can be implemented.

FIG. 16 is a block diagram illustrating an example of a processing system 1600 in which at least some operations described herein can be implemented. For example, the processing system 1600 may be responsible for generating an interface through which an end user specifies which virtual machines should be monitored, which network tool(s) virtualized traffic should be dispatched to, etc. As another example, at least a portion of the processing system 1600 may be included in a computing device (e.g., a server) that supports a cloud computing platform. The computing system may include one or more central processing units ("processors") 1602, main memory 1606, non-volatile memory 1610, network adapter 1612 (e.g., network interfaces), display 1618, input/output devices 1620, control device 1622 (e.g., keyboard and pointing devices), drive unit 1624 including a storage medium 1626, and signal generation device 1630 that are communicatively connected to a bus 1616. The bus 1616 is illustrated as an abstraction that represents any one or more separate physical buses, point to point connections, or both connected by appropriate bridges, adapters, or controllers. The bus 1616, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire." A bus may also be responsible for relaying data packets (e.g., via full or half duplex wires) between components of a network appliance, such as a switching engine, network port(s), tool port(s), etc.

In various embodiments, the processing system 1600 operates as a standalone device, although the processing system 1600 may be connected (e.g., wired or wirelessly) to other machines. For example, the processing system 1600 may include a terminal that is coupled directly to a network appliance. As another example, the computing system 1600 may be wirelessly coupled to the network appliance.

In various embodiments, the processing system 1600 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the computing system.

While the main memory 1606, non-volatile memory 1610, and storage medium 1626 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 1628. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module, or sequence of instructions referred to as "computer programs." The computer programs typically comprise one or more instructions (e.g., instructions 1604, 1608, 1628) set at various times in various memory and storage devices in a computer, and that, when read and executed by one or more processing units or processors 1602, cause the processing system 1600 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 1610, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 1612 enables the processing system 1600 to mediate data in a network 1614 with an entity that is external to the processing system 1600, such as a network appliance, through any known and/or convenient communications protocol supported by the processing system 1600 and the external entity. The network adapter 1612 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1612 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, including intrusion prevention, intrusion detection, next-generation firewall, personal firewall, etc.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A system for monitoring virtualized traffic, the system comprising:
   an agent that, when in operation, is hosted by a virtual machine and configured to
      monitor virtualized traffic traversing the virtual machine, and
      forward the virtualized traffic to an ingress endpoint of a first tunnel; and
   a network visibility appliance configured to
      receive the virtualized traffic at an egress endpoint of the first tunnel, and
      forward at least a portion of the virtualized traffic to an ingress endpoint of a second tunnel for transmission to a network tool.

2. The system of claim 1, wherein, when in operation, the virtual machine is hosted on a multi-tenant cloud computing platform.

3. The system of claim 2, wherein, when in operation, the network visibility appliance is hosted on the multi-tenant cloud computing platform.

4. The system of claim 3, wherein, when in operation, the network tool is hosted on the multi-tenant cloud computing platform.

5. The system of claim 3, wherein, when in operation, the network tool resides within a single-tenant cloud computing platform or a dedicated storage medium managed by a tenant of the virtual machine.

6. The system of claim 1, wherein the agent is further configured to:
   sample the virtualized traffic at a specified rate to reduce traffic volume delivered to the network visibility appliance via the first tunnel.

7. The system of claim 1, wherein the virtualized traffic forwarded to the network visibility appliance by the agent includes duplicate copies of data packets handled by the virtual machine.

8. A method for monitoring virtualized traffic, the method comprising:
   receiving, by a virtual programmable switch, virtualized traffic at an egress endpoint of a first tunnel,
      wherein the virtualized traffic includes data packets received from a virtual machine;
   applying, by the virtual programmable switch, a traffic policy to filter the virtualized traffic; and forwarding, by the virtual programmable switch, the filtered virtualized traffic to an ingress endpoint of a second tunnel for transmission to a network tool.

9. The method of claim 8, further comprising:
establishing, by an agent that, when in operation, is hosted by the virtual machine, a tunnel connection with the virtual programmable switch;
monitoring, by the agent, a plurality of traffic flows of the virtual machine;
selecting, by the agent, a traffic flow from the plurality of traffic flows for monitoring, the traffic flow including the virtualized traffic; and
forwarding, by the agent, the traffic flow to an ingress endpoint of the first tunnel for transmission to the virtual programmable switch.

10. The method of claim 9, further comprising:
sampling, by the agent, the traffic flow at a specified rate to reduce traffic volume delivered to the virtual programmable switch via the first tunnel.

11. The method of claim 8, wherein, when in operation, the virtual machine is hosted on a multi-tenant cloud computing platform, and wherein the multi-tenant cloud computing platform mirrors a desired traffic flow to produce the virtualized traffic provided to the virtual programmable switch.

12. The method of claim 8, further comprising:
receiving, by the virtual programmable switch, at least a portion of the filtered virtualized traffic at an egress endpoint of the second tunnel; and
forwarding, by the virtual programmable switch, the at least a portion of the filtered virtualized traffic to the egress endpoint of the first tunnel for transmission to the virtual machine.

13. The method of claim 8, wherein the traffic policy includes a filtering policy, a slicing policy, a masking policy, a de-duplication policy, a compression policy, or a combination thereof.

14. The method of claim 8, wherein, when in operation, the virtual machine is hosted on a multi-tenant cloud computing platform, and wherein, when in operation, the network tool is hosted on a single-tenant cloud computing platform managed by a tenant of the virtual machine.

15. The method of claim 14, wherein the tenant is an enterprise.

16. A system comprising:
an agent, mounted on a virtual machine, that acquires virtualized traffic of a specific end user and forwards the virtualized traffic downstream for further analysis; and
a network visibility appliance configured to
receive the virtualized traffic at an egress endpoint of a first tunnel, and
dispatch at least some of the virtualized traffic to an ingress endpoint of a second tunnel for transmission to a network tool.

17. The system of claim 16, further comprising:
a controller configured to
interface with an application programming interface (API) of a multi-tenant cloud computing platform to identify the virtual machine belonging to the specific end user and traffic flows of the virtual machine, and
receive user input indicative of a selection of a specific traffic flow of the virtual machine.

18. The system of claim 17, wherein the agent is further configured to:
create a duplicate traffic flow by mirroring the specific traffic flow of the virtual machine, and
forward the duplicate traffic flow as the virtualized traffic to an ingress endpoint of the first tunnel.

19. The system of claim 17, wherein the controller is further configured to:
support a user interface through which the specific end user provides the user input.

20. The system of claim 17, wherein the specific traffic flow represents virtualized traffic traversing a specific virtualized network interface card (vNIC) of the virtual machine.

21. The system of claim 20, wherein the specific vNIC is one of a plurality of vNICs whose virtualized traffic is monitored by a virtual programmable switch of the network visibility appliance.

22. The system of claim 18, wherein the agent is further configured to:
apply a traffic filter before forwarding the duplicate traffic flow to the ingress endpoint of the first tunnel.

23. The system of claim 16, wherein the network visibility appliance is further configured to:
apply a traffic filter before forwarding the at least some virtualized traffic to the ingress endpoint of the second tunnel.

* * * * *